March 12, 1968 A. H. REDFORD ET AL 3,372,793
VIBRATORY CONVEYOR SYSTEMS
Filed Sept. 14, 1966 4 Sheets-Sheet 4

United States Patent Office 3,372,793
Patented Mar. 12, 1968

3,372,793
VIBRATORY CONVEYOR SYSTEMS
Alan Harry Redford, Whitefield, Manchester, and Geoffrey Boothroyd, Prestwich, Manchester, England, assignors to National Research Development Corporation, London, England, a British corporation
Filed Sept. 14, 1966, Ser. No. 579,272
Claims priority, application Great Britain, Sept. 16, 1965, 39,601/65
2 Claims. (Cl. 198—220)

ABSTRACT OF THE DISCLOSURE

Vibratory conveyors for conveying elements along a rectilinear or curvilinear path and including two independently controllable suspension means, one for producing substantially vertical agitating vibrations and the other for producing substantially horizontal conveying vibrations.

---

This invention relates to vibratory conveyor systems and is particularly concerned with an improved method of operation of vibratory conveyor systems.

Vibratory conveyor systems of both the "in-line" type, the spiral-type and the bowl type are well known for the carrying or delivery of small elements, for example nuts and bolts, where a conveyor surface is supported on a flexible mounting and subjected to a vibration of a given frequency and, in the case where the source of vibration is an electro-magnet vibrator(s), the frequency employed is usually that of the A.C. mains frequency of 50 c./s.

The conveyor is mounted so as to be capable of possessing components of vibration in both the vertical and horizontal planes, and in the case of a horizontally positioned "in-line" conveyor an applied vibration of suitable amplitude will produce movement of an element or elements along the conveyor. With the conveyor in an inclined position in many circumstances it is not possible to convey elements up the conveyor track. In a bowl type conveyor, however, the flexible mounting comprises flexible spring members attached to the circumference of the underside of the bowl each of said spring members permitting, during vibration, a horizontal component of torsional vibration and a vertical component of vibration. The resultant of these two motions causes any point on the bowl track to perform an approximately linear vibration at an angle to the horizontal which angle will depend on the relative magnitudes of the horizontal and vertical motions. Thus elements contained in the bowl are subjected to a resultant motion which causes the elements to move somewhat spirally towards the edge of the bowl. The track of a bowl-type conveyor is that of a helix positioned on the inner surface of the peripheral wall of the bowl, and elements are normally conveyed up the track as a result of the continual movement of the elements across the bottom of the bowl feeding elements onto the helical track.

In operation of such "in-line" type and bowl-type conveyors hitherto, however, the motion of an element on the conveyor surface is directly related to the vertical and horizontal components of the vibration of the conveyor surface and is a dependent motion. Where the track of a conveyor is inclined to the horizontal, vibration of the conveyor surface produces corresponding parallel and normal components of motion of the element and, as the feed-rate of an element is dependent mainly on the parallel motion of the conveyor surface, increasing or decreasing the feed rate of an element necessitates increasing or decreasing the parallel motion of the conveyor surface, but, in such known methods, as the vertical and horizontal components of vibration of the conveyor surface are in phase and linked together the vertical component will also increase or decrease in unison. It is found in the operation of such known types of conveyors that when the applied vibratory force is increased so as to produce an increased feed rate of elements along an inclined conveyor surface this increase also often produces undesirable agitation of the elements presumably due to the increase in the vertical component of motion and this agitation tends to be accompanied by a random delivery of elements which may also be undesirable.

According to the invention there is provided a method for the operation of vibratory conveyors wherein the applied vibrations are arranged to be controlled independently each of the other and are preferably also variable.

Further in accordance with the invention there is provided a method for the operation of vibratory conveyors wherein the components of the applied vibrations are arranged to be independent each of the other and preferably also variable.

In the method of the invention by arranging for the components of the applied vibration to be independent each of the other, the phase relationship between the said components can be controlled. Also, in accordance with the invention the magnitude of the vertical and horizontal components of vibration may be themselves each and independently controlled.

It will be appreciated that by having independent and variable control of both components of vibration the motion of an element parallel to the conveyor can be controlled by varying the parallel component of vibration only, and if the normal component of vibration is maintained at a level just below that which causes instability of an element on the conveyor surface, control of the parallel motion or feed rate of an element may be obtained by increasing or decreasing the parallel component of vibration only.

In practice at least two electromagnetic vibrators are used, one will normally give rise to the production of the parallel component of vibration, the other to the production of the normal component of vibration. The electromagnetic vibrators may be driven by a single oscillator 61 (as shown in FIGURES 5 and 6) whose output is split and the two parts fed into a vibrator controller 62. In the vibrator controller there is an attenuator 63 for varying the amplitude of one part of the output signal from the oscillator and an attenuator 64 and phase shifter 65 for varying both the phase and the amplitude of the other part of the output signal from the oscillator. The two output signals from the vibration controller are then fed to separate power amplifiers 66 and 67 the outputs from which operate the electromagnetic vibrators. An alternative method for producing two electrical signals having a variable phase shift therebetween is that of employing a poly-phase transformer 68, as shown in FIGURE 6 wherein the position of the primary windings relative to the secondary windings may be altered physically to give the desired phase-shift between the two signals. By variation of the amplitude of the normal and parallel components of vibration a vibration angle (see below) of from 0° to 90° may be employed. Also a phase shift between the component vibrations of up to 360° may be obtained.

From experiments carried out on an "in-line" type and bowl-type conveyor the effect of varying the phase relationship between the normal and parallel components of vibration on the parallel motion or feed rate of an element on a conveyor surface has been observed. This effect has also been further studied in relation to the nature of material used for the conveyor surface which is in contact with an element. Three conveyor surface materials were employed: steel, nylon and rubber, with the conveyed element being a steel pellet. The results of these experiments are given graphically in FIGURE 1 using a vibration frequency of 21.5 c./s., a track angle of 4°, a vibration angle of 20° and a maximum normal acceleration component of 1.2×32.2 ft./sec.² The vibration angle is defined as the angle the tangent of which is the ratio:

$$\frac{\text{Normal amplitude of the applied vibration}}{\text{Parallel amplitude of the applied vibration}}$$

The invention will now be described by way of example with reference to the accompanying drawings in which:

FIGURES 1, 1a and 2 show graphically the results of experiments carried out with the vibratory conveyors of the invention;

Figure 1:
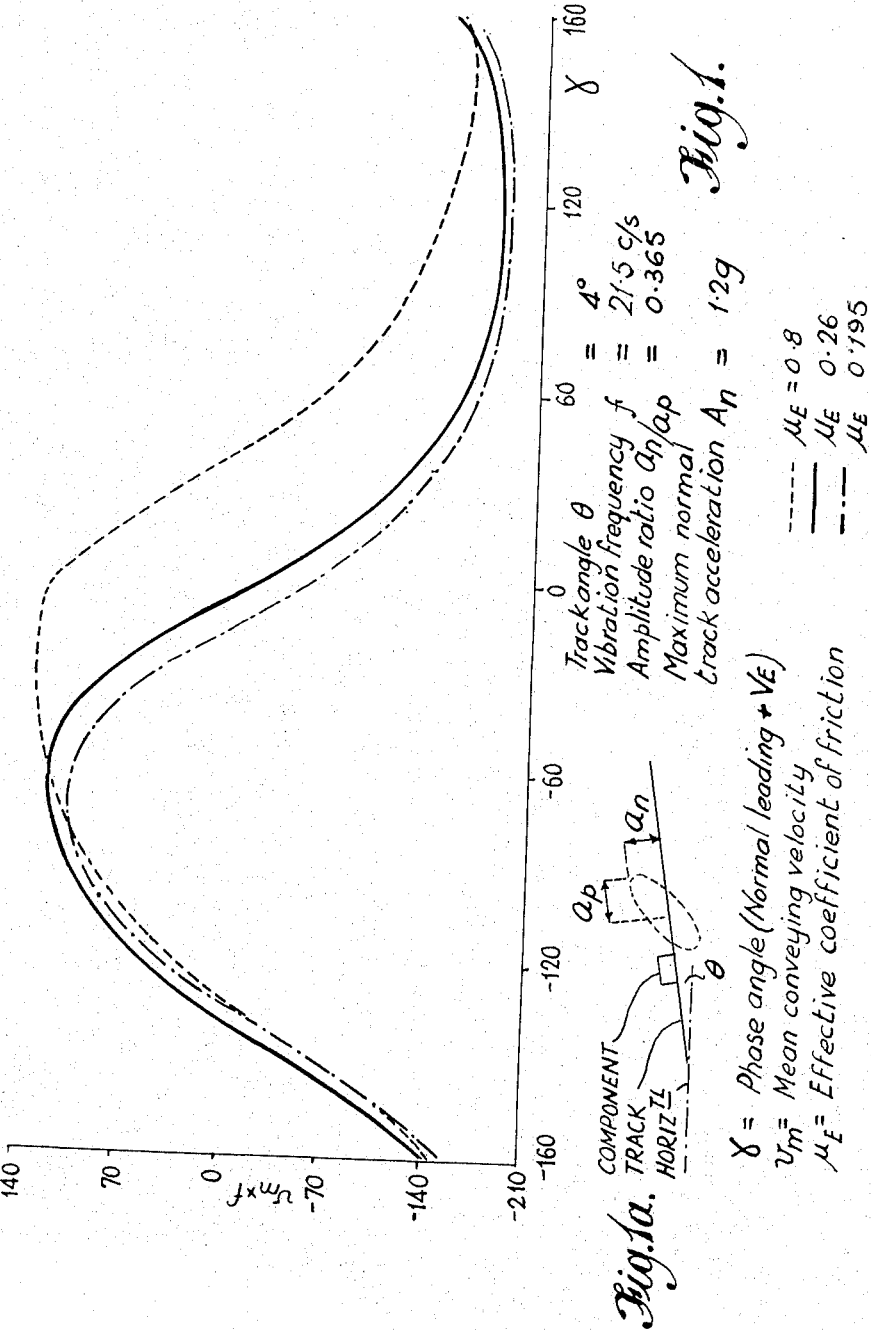

In FIGURE 1 the product of the mean conveying velocity, $v_m$ and the frequency of vibration, $f$ is plotted against the phase difference, $\gamma$ between the two components of motion. In the results illustrated, the normal ($a_n$) and the parallel ($a_p$) amplitudes of the applied vibration are both kept constant. The relationships are plotted for the three values of the effective coefficient of friction, $\mu$ between component and track which cover the range of values most likely to be met in practice. It is seen from FIGURE 1 that when the phase angle is zero, simulating a conventional feeder, the conveying velocity is very sensitive to changes in $\mu$, for example for values of $\mu$ less than 0.3, components on the track move in a backward direction, i.e., down the conveyor track. This means that when the components of vibration are in phase the steel-steel and the nylon-steel combinations give a negative conveying result, that is the element moves down the conveyor track, whereas the steel-rubber combination gives a positive conveying result, that is the element moves up the conveyor track. The results show further that when the components of vibration are out-of-phase and the parallel acceleration component of the applied vibration leads the normal acceleration component of the applied vibration by 65°, the conveying velocity becomes uniformly high for all values of $\mu$ considered.

Figure 2:
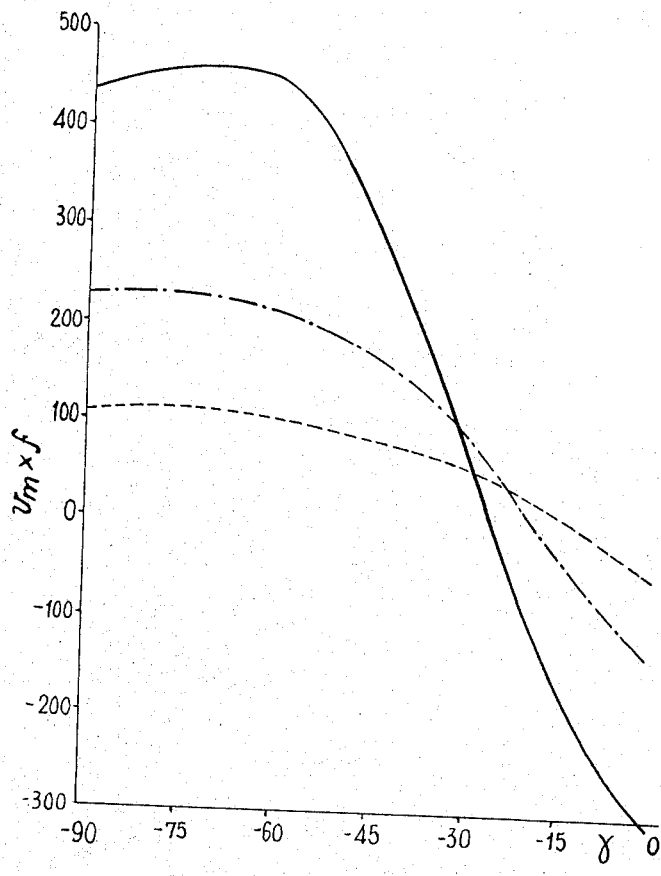
Figure 5:
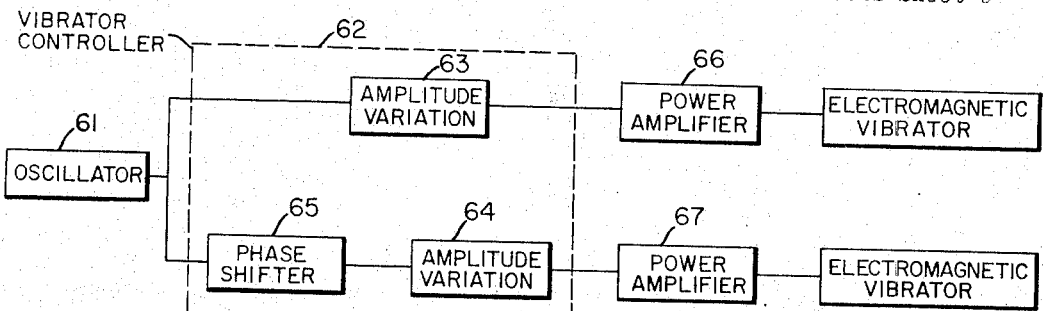
FIGURES 5 and 6 show two ways of energizing the first and second driving means.

FIGURE 2 shows the effect on the mean conveying velocity, $v_m$ of changing $\gamma$ in the relevant range ($-90°-0°$) for three values of the parallel amplitude $a_p$ when the normal amplitude $a_n$ is kept constant. In obtaining these results a track angle of 4° and a coefficient of friction of 0.2 were chosen because it is considered that these represent the most severe conditions likely to be encountered in practice. It is clear from the figure that, for conventional conveying, i.e., when components of the applied vibration are in phase, as $a_p$ is increased, indicating an increase in the parallel acceleration component of the applied vibration, the component's backward conveying velocity increases. However when the components of vibration are out-of-phase by the optimum phase angle ($\gamma=-65°$) the component's forward velocity is increased as a result of an increase in a $a_p$. It is also of interest to note that if the vibration frequency is 25 c./s., a conveying velocity as high as 18 in./s. may be achieved.

The above results show that definite advantages are attributable to the operation of a vibratory conveyor under the optimum "out of phase" conditions in accordance with the invention. Firstly, the high conveying velocities attainable are sensibly independent of the nature of the components being conveyed. Secondly, because the feed rate can be controlled by adjusting the parallel component of vibration only, the normal acceleration component of vibration may be held constant at a level which does not cause erratic component movement (in the results presented the normal acceleration component of applied vibration was 1.2× acceleration due to gravity which represents stable conveying for most materials). Thirdly, if $a_p$ is gradually increased as components move up the track the conveying velocity of the components would gradually increase, resulting in a separation of components as they move up the track. This situation may be achieved in practice by gradually increasing the radius of the conveyor track, the increased separation of components resulting in more efficient component orientation and greater reliability of component delivery.

Figure 3:
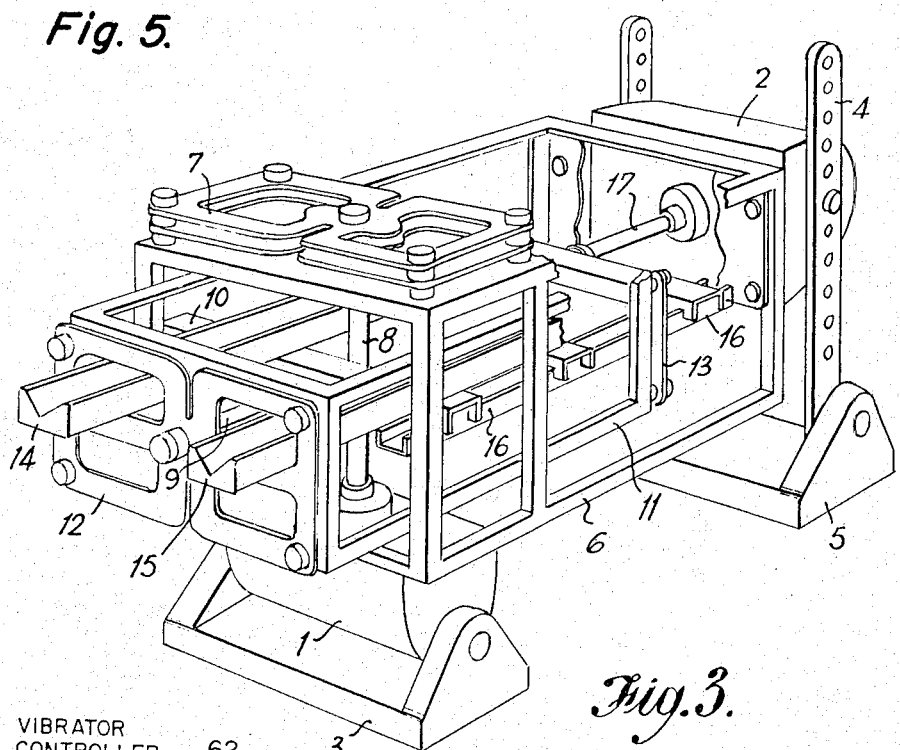
FIGURE 3 shows a front elevation of a double track "in-line" conveyor.
Figure 6:
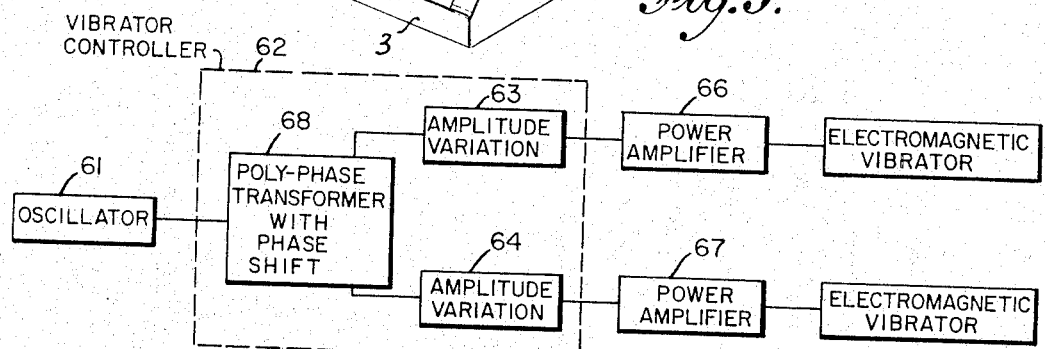

In FIGURE 3 electromagnetic vibrators 1 and 2 are positioned for production of vibration normal to and parallel to conveyor tracks 14 and 15 respectively. Electromagnetic vibrator 1 is pivotally connected to a base member 3 and electromagnetic vibrator 2 is connected by means of a spacing bar 4 to a base member 5.

A rigid primary frame 6 is associated with electromagnetic vibrators 1 and 2, said primary frame 6 having a flexible member 7 located on the upper side and at one end of said frame 6. A vibrator actuator rod 8 links the centre point of the flexible member 7 to the electromagnetic vibrator 1. A secondary frame 11 having flexible members 12 and 13 mounted at each end thereof is located within primary frame 6. A carriage 16 positioned within secondary frame 11 is coupled thereto by the flexible members, the midpoint of each of which is connected by a respective member 9 to a respective cross-member 10 of the carriage 16 (one end connection only being shown). The secondary frame 11 is supported within the primary frame 6 by means of the vibrator actuator 8 being rigidly connected to the frame 11 through diagonal struts across the top and bottom of frame 11 (not shown). A vibrator actuator rod 17 connects the electromagnetic vibrator 2 to the carriage 16 and rigidly mounted on said carriage 16 are two parallel conveyor tracks 14 and 15. The mounting of the conveyor tracks 14 and 15 on carriage 16 is such that vibration impulses imparted to the carriage 16 by the electromagnetic vibrators 1 and 2 are transmitted to the conveyor tracks 14 and 15 and enable the tracks to perform vibratory motion both normal to and parallel to the conveyor tracks 14 and 15. The angle at which the conveyor tracks 14 and 15 may be inclined to the horizontal is adjustable and may be varied by selection of the point of support on the support bar 4 of the electromagnetic vibrator 2.

Figure 4:
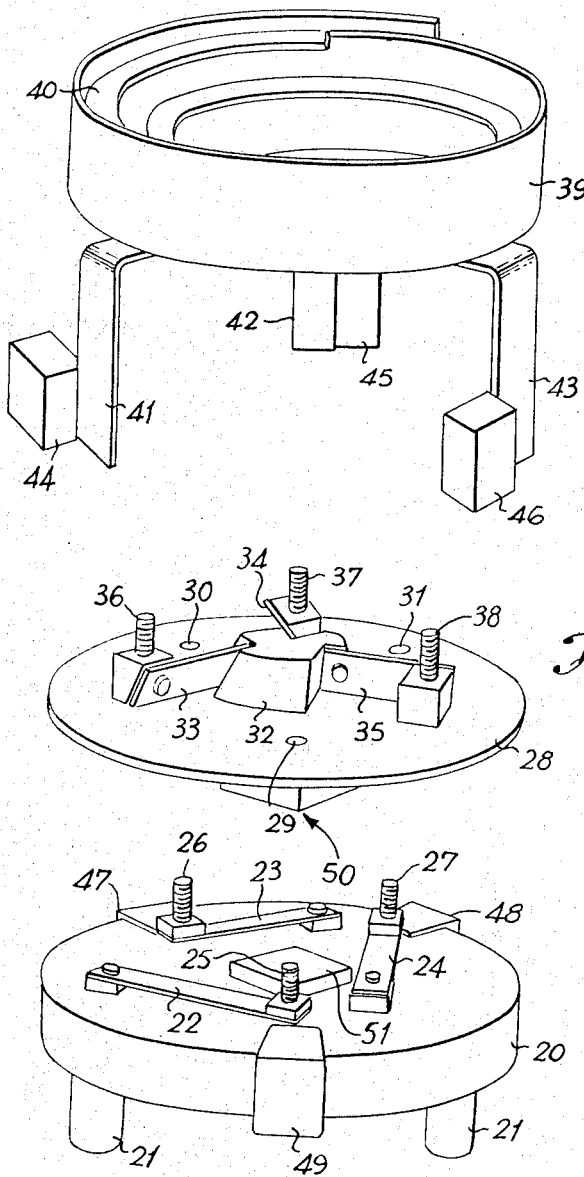
FIGURE 4 shows an exploded view of a vibratory bowl feeder (the same principles of construction apply to a spiral type elevator)

In FIGURE 4, a circular base member 20 is mounted on feet 21 (one not shown) positioned symmetrically on the lower surface of base 20. Leaf springs 22, 23 and 24 are mounted on the upper surface of base 20 in tangential alignment with respect to a circle concentric with the circumference of the base member 20 but of smaller diameter. Leaf springs 22, 23 and 24 are mounted such that one end successively of each leaf spring is secured to the upper surface of base 20, the longitudinal axis of each spring being inclined so as to be parallel to the helical track 40. The lateral axis of each leaf spring 22, 23 and 24 is parallel to the upper surface of the base member 20. Attached to the free end of leaf springs 22, 23 and 24 are upwardly extending externally threaded members 25, 26 and 27 respectively. An intermediate suspension plate 28, circular in form, has three symmetrically disposed holes 29, 30 and 31 therein, in which holes the threaded members 25, 26 and 27 locate to secure the suspension plate 28 to the leaf springs 22, 23 and 24 respectively. A boss 32 centrally positioned on the upper surface of the suspension plate 28 has one end of each leaf spring 33, 34 and 35 attached to the boss 32 such that the springs project radially from the boss 32. The longitudinal axis of each of the leaf springs 33, 34 and 35 being parallel to the plane of the suspension plate 28 and at a distance therefrom such that the free end of each spring is substantially clear of the suspension plate 28: the lateral axis of each of the leaf springs 33, 34 and 35 being normal to the helical track 40. Attached to the free end of leaf springs 33, 34 and 35 are upwardly extending externally threaded members 36, 37 and 38, respectively. A bowl 39 has three symmetrically disposed holes (not shown) on the underside thereof in which holes the threaded members 36, 37 and 38 locate to secure the bowl 39 to the suspension plate 28. A helical track 40 is formed on the inner peripheral surface of the bowl 39. Legs 41, 42 and 43 attached to the lower edge of the bowl 39 carry electromagnetic stacks 44, 45 and 46, respectively. The electromagnetic stacks 44, 45 and 46 are positioned on the legs 41, 42 and 43 to locate electro-magnets 47, 48 and 49 respectively attached to the rim of the base member 20 when the bowl feeder is assembled. Similarly an electromagnetic stack 50 centrally positioned on the lower surface of the suspension plate 28 locates an electromagnet 51 centrally positioned on the upper surface of the base member 20.

In operation, the acceleration component of the applied vibration normal to the helical track 40 is imparted to the intermediate suspension plate 28 by the electromagnet 51 via the electromagnetic stack 50 to the bowl 39 and thus to the helical conveyor track 40. The bowl 39 in being supported on the leaf springs 22, 23 and 24 undergoes sinusoidal oscillation in a plane normal to the helical track 40. The acceleration component of the applied vibration parallel to the helical track 40 is imparted to the bowl 39 and the conveyor track 40 by the electro-magnets 47, 48 and 49 via the legs 41, 42 and 43 and the electromagnetic stacks 44, 45 and 46, respectively. The bowl 39 then by virtue of it being mounted on the leaf springs 33, 34 and 35 undergoes sinusoidal oscillation in a plane parallel to the helical track 40, any point on the helical track moving in an arc of radius having a direct relation to the length of the leaf springs 33, 34 and 35.

We claim:
1. A vibratory conveyor for conveying a load along a predetermined path, said conveyor comprising a load-supporting means, surfaces to said load-supporting means defining said path, a resilient mounting for the load-supporting means, first suspension means of said resilient mounting arranged to permit movement of the load-supporting means relative to the first suspension means only in a substantially vertical first direction, second suspension means of said resilient mounting arranged to permit movement of the load-supporting means relative to the second suspension means only in a second direction which second direction is substantially normal to said first direction, first driving means adapted, on energization, to vibrate said first suspension means in the first direction, second driving means adapted, on energization, to vibrate said second suspension means in the second direction, first energizing means connected with the first driving means, second energizing means connected with the second driving means, and continuously variable phase shift means connected with at least one of said energizing means.

2. A vibratory conveyor as claimed in claim 1 wherein said phase shift means is effective to cause said first driving means to lag behind said second driving means by an angle within the range of 0° to 90°.

References Cited

UNITED STATES PATENTS

| 2,629,485 | 2/1953 | Sherwen | 198—220 |
| 2,967,606 | 1/1961 | Peterson | 198—220 |
| 3,258,111 | 6/1966 | Spurlin et al. | 198—220 |

FOREIGN PATENTS

| 993,645 | 6/1965 | Great Britain. |

EDWARD A. SROKA, *Primary Examiner.*

EVON C. BLUNK, *Examiner.*

M. L. AJEMAN, *Assistant Examiner.*